(12) United States Patent
Ide

(10) Patent No.: US 10,737,525 B2
(45) Date of Patent: Aug. 11, 2020

(54) WATERMARKED PAPER

(71) Applicant: TOPPAN PRINTING CO., LTD., Tokyo (JP)

(72) Inventor: Hidetaka Ide, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 5 days.

(21) Appl. No.: 15/823,845

(22) Filed: Nov. 28, 2017

(65) Prior Publication Data

US 2018/0086131 A1  Mar. 29, 2018

Related U.S. Application Data

(63) Continuation of application No. PCT/JP2016/002902, filed on Jun. 15, 2016.

(30) Foreign Application Priority Data

Jun. 15, 2015 (JP) ................. 2015-120500

(51) Int. Cl.
*B42D 25/333* (2014.01)
*B41M 3/14* (2006.01)
(Continued)

(52) U.S. Cl.
CPC ............. *B42D 25/333* (2014.10); *B41M 3/14* (2013.01); *B42D 25/328* (2014.10);
(Continued)

(58) Field of Classification Search
CPC .................................................. B42D 25/333
See application file for complete search history.

(56) References Cited

U.S. PATENT DOCUMENTS 4,472,627 A * 9/1984 Weinberger ............ D21H 21/48
  235/487
5,566,982 A * 10/1996 Lehureau .............. G02F 1/0128
  283/83

(Continued)

FOREIGN PATENT DOCUMENTS

EP  1 936 603        6/2008
EP  1 988 514 A1   11/2008
(Continued)

OTHER PUBLICATIONS

Araki, et al., "Electrochemical Optical-Modulation Device with Reversible Transformation between Transparent, Mirror, and Black," Advanced Materials (2012), v. 24, pp. OP122-OP126.
(Continued)

*Primary Examiner* — David R Dunn
*Assistant Examiner* — Christopher E Veraa
(74) *Attorney, Agent, or Firm* — Foley & Lardner LLP

(57) ABSTRACT

A watermarked paper which allows for arbitrary changing of a watermark pattern or displaying of recorded optical image information even during observation from the same field of view. The watermarked paper is obtained by mixing into a paper layer an intermediate layer with a thickness of 6-300 μm that has a dimmer of which a light transmission amount changes according to a voltage state, characterized in that the watermarked paper includes a power supply for supplying power to the dimmer in the intermediate layer or on a paper surface, and a watermark image is changed by switching the dimmer between a transparent state and a mirror state by controlling a voltage by power supplied from the power supply.

11 Claims, 7 Drawing Sheets

(51) Int. Cl.
*D21H 21/40* (2006.01)
*G02B 5/18* (2006.01)
*B42D 25/36* (2014.01)
*B42D 25/328* (2014.01)
*G02F 1/15* (2019.01)
*B42D 25/351* (2014.01)

(52) U.S. Cl.
CPC ............ *B42D 25/351* (2014.10); *B42D 25/36* (2014.10); *D21H 21/40* (2013.01); *G02B 5/18* (2013.01); *G02F 1/15* (2013.01)

(56) References Cited

U.S. PATENT DOCUMENTS

| | | | |
|---|---|---|---|
| 8,284,472 B2* | 10/2012 | Yoshimura | G02F 1/13454 359/267 |
| 2006/0124260 A1* | 6/2006 | Mi | B41M 3/10 162/110 |
| 2008/0035736 A1* | 2/2008 | Tompkin | G07D 7/00 235/488 |
| 2008/0259416 A1* | 10/2008 | Peters | G02B 5/18 359/2 |
| 2010/0295290 A1* | 11/2010 | Muth | B32B 27/06 283/109 |
| 2011/0273411 A1* | 11/2011 | Seo | G02F 1/133305 345/205 |
| 2012/0104102 A1* | 5/2012 | Rancien | B41M 3/10 235/488 |
| 2013/0147179 A1 | 6/2013 | Baloukas et al. | |
| 2014/0022493 A1* | 1/2014 | Hoshino | G09F 3/0294 349/86 |
| 2014/0218663 A1* | 8/2014 | Stahl | B42D 25/328 349/86 |
| 2014/0307192 A1* | 10/2014 | Stahl | G02F 1/155 349/33 |
| 2014/0340729 A1* | 11/2014 | Tajima | G02F 1/1523 359/266 |
| 2017/0121910 A1* | 5/2017 | Blake | D21H 21/44 |

FOREIGN PATENT DOCUMENTS

| | | |
|---|---|---|
| JP | 02-041034 | 9/1990 |
| JP | 2002-067470 | 3/2002 |
| JP | 2004-102840 | 4/2004 |
| JP | 2008-513861 | 5/2008 |
| JP | H04-149585 | 9/2008 |
| JP | 4391287 | 12/2009 |
| JP | 2010-524070 | 7/2010 |
| JP | 2013-104141 | 5/2013 |
| JP | 2013-186183 | 9/2013 |
| JP | 2014-112183 | 6/2014 |
| WO | WO-2016/117336 | 7/2016 |

OTHER PUBLICATIONS

International Search Report issued in International Patent Application No. PCT/JP2016/002902 dated Aug. 23, 2016.
Extended European Search Report dated Jan. 28, 2019 in corresponding application No. 16811244.9.

* cited by examiner

WATERMARKED PAPER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/002902, filed on Jun. 15, 2016, which is based upon and claims the benefit of priority of Japanese Patent Application No. 2015-120500, filed Jun. 15, 2015, the entireties of which are hereby incorporated by reference.

TECHNICAL FIELD

The present invention relates to watermarked paper, and particularly to watermarked paper for forgery prevention.

BACKGROUND ART

Currently, watermarked paper is widely used in all fields from applications to general letters to securities with a monetary value such as share certificates, bond certificates and gift certificates, and banknotes. Among them, securities generally use paper in which, so that forgery or altering is not easily performed, a watermark is applied to the paper itself, or special printing such as micro characters, intaglio, hidden characters and fluorescent printing are applied, or a foil having a metallic luster such as a gold foil or a silver foil or a foil having a diffraction structure such as a hologram or a diffraction grating that could represent a stereoscopic image or a special decorative image by the use of light interference is applied by transferring or applying a seal (for example, see PTLs 1 and 2).

As methods and configurations for applying a watermark, there have been proposed methods such as a white watermarking method and a dark watermarking method for forming a pattern by changing a thickness of paper using a special papermaking machine, a configuration in which a base material on which a watermark pattern is previously printed is created and a paper base material is bonded onto the front and back sides of the base material, and a method in which a color former is previously applied to a base material, a paper base material is bonded to the front and back sides of the base material and finally a laser is irradiated to obtain a watermark image, and the like (for example, see PTLs 3 and 4).

Meanwhile, in recent years, for decreasing an energy consumption amount, development of a dimming mirror has progressed aiming at improvement of a heat insulating property by a light-blocking effect. A dimming mirror can be realized by forming, on a glass, a dimming mirror element in which thin-film materials are combined so as to control optical characteristics arbitrarily. In the case where all of thin-film materials can be formed from solids, a dimming mirror is allowed to be formed not only on a glass but also on a plastic film that is bendable (for example, see PTL 5, NPL 1 and the like). At present, these dimming mirror elements are limited to uses as a window glass of a vehicle or of a building, an electronic display device such as a liquid crystal display and the like, and have not been applied to other uses.

CITATION LIST

Patent Literature

[PTL 1] JP 1615000 B
[PTL 2] JP H4-149585 A
[PTL 3] JP 2002-67470 A
[PTL 4] JP 4391287 B
[PTL 5] JP 2014-112183 A

Non Patent Literature

[NPL 1] Adv. Mater. 2012, 24, OP122-OP126, S. Araki et al.

SUMMARY OF THE INVENTION

Technical Problem

However, since a diffraction structure used for securities, banknotes and the like is such that it is processed into a sticker, a transfer foil and the like and then attached to a to-be-attached object, forgery has increased, for example, a diffraction structure may be peeled off and reattached to a forgery to perform falsification, or a forged diffraction structure may be attached. Thus, there is a problem that forgery prevention effects of diffraction structures have been degraded recently.

Even today, for the general public to determine the authenticity of securities and banknotes, a watermark in paper is still effective. Therefore, a watermark is used for actual forgery-preventing paper. However, inside Japan, watermarked paper manufactured by private companies are limited only to 2 tones, which is known as a white watermarking method, and watermarked paper obtained using a dark watermarking method with multiple tones is used only for banknotes.

Each of such watermarked papers configures a watermark through variations in light transmittance due to variations in thickness of a paper base material, which causes problems that for a light watermark, a thickness of a paper base material must be reduced thereby decreasing the strength, and that for improvement of a contrast effect of a watermark, the difference in surface-layer paper thickness of a watermark part must be increased, leading to irregularities in watermarked paper itself and poor printability of the watermark part.

Furthermore, since conventional watermarked paper achieves a watermark effect due to the thickness of the paper (contrasting density of transmitted light), the pattern is previously determined, and the watermark pattern cannot be changed.

The present invention solves the above conventional problems. The problem of the present invention is to provide watermarked paper which allows arbitrary change of a watermark pattern and display of recorded optical image information even during observation from the same field of view.

Solution to Problem

In order to solve the above problems, the invention described in one embodiment provides watermarked paper obtained by mixing into a paper layer an intermediate layer with a thickness of 6-300 μm that has a dimmer of which a light transmission amount changes according to a voltage state, characterized in that the watermarked paper includes a power supply for supplying power to the dimmer in the intermediate layer or on a paper surface, and a watermark image is changed by switching the dimmer between a transparent state and a mirror state by controlling a voltage by power supplied from the power supply.

DESCRIPTION OF EMBODIMENTS

Hereinafter, preferred embodiments of the present invention will be described in detail with reference to the drawings. It is to be understood that the embodiments described below are intended to be representative of the present invention and that the present invention is not necessarily limited to those embodiments. Each of the embodiments shown below is only one example of the present invention and could be changed in design as appropriate by a person skilled in the art to still achieve the present invention.

First Embodiment

Figure 1:
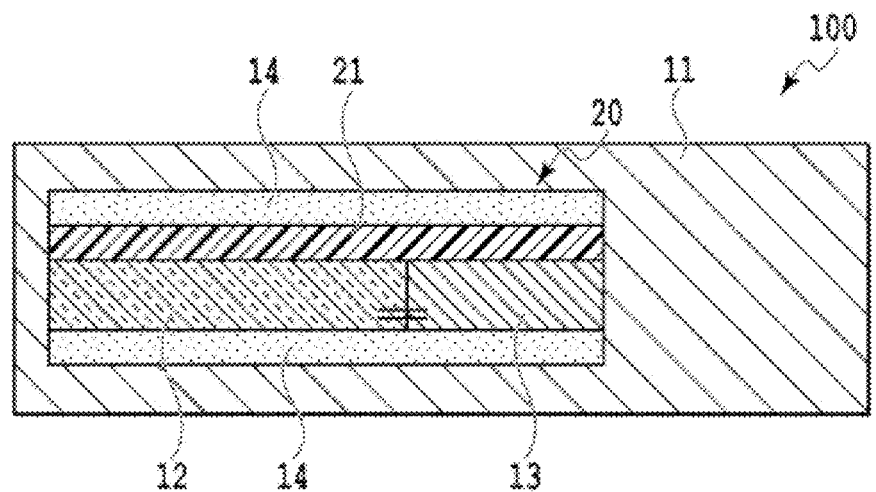
FIG. 1 is a cross-sectional view showing a layer configuration of watermarked paper according to the first embodiment.
Figure 2:
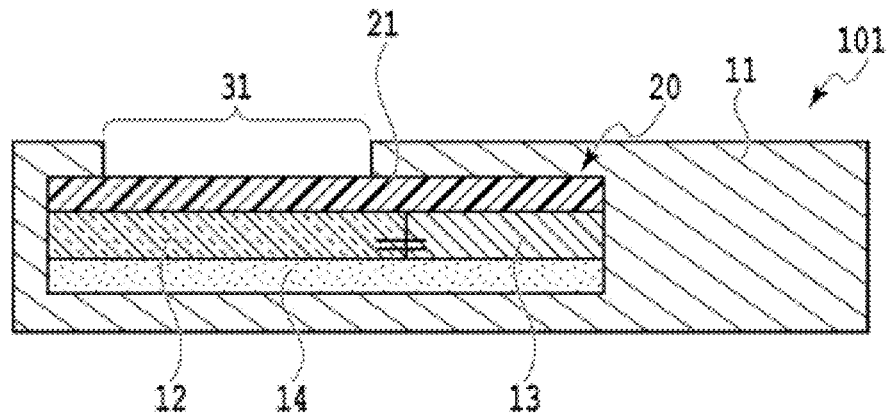
FIG. 2 is a cross-sectional view showing another layer configuration of watermarked paper according to the first embodiment.

FIG. 1 is a cross-sectional view showing a layer configuration of watermarked paper according to the first embodiment. In the watermarked paper 100, an intermediate layer 20 having a dimmer 12 and a power supply 13 is mixed into a paper base material 11. The intermediate layer 20 has at least the dimmer 12, and may have optionally transparent layers such as an adhesive layer 14 and an intermediate layer base material 21 as long as they do not prevent transmission of light. The power supply 13 may be provided in the intermediate layer 20 as shown in FIG. 1, but also can be provided on the surface of the watermarked paper 100 as long as the power supply 13 can supply power to the dimmer 12. The watermarked paper 100 of the present embodiment may be configured to be provided with a windowed part 31 where a part of the intermediate layer 20 of the watermarked paper 101 is exposed as shown in FIG. 2. The windowed part 31 is formed at a position where a watermark image is visible.

(Paper Base Material)

As a raw material of the paper base material 11 of the present invention, softwood and hardwood plant pulp, cotton, rice, esparto, bagasse, hemp, flax, kenaf, cannabis and the like, and synthetic fibers made from plastics such as polyethylene terephthalate, polypropylene, polyacrylate and polyvinyl chloride can be used.

Then, a water dilute raw material obtained by beating plant pulp or a synthetic fiber in water is mixed and tangled, and subsequently is dehydrated/dried, to form the paper base material 11. At this time, paper can obtain strength between fibers by hydrogen bonds between hydroxyl groups of the raw material, cellulose. Fillers that are used for paper include clay, talc, calcium carbonate, titanium dioxide and the like, sizing agents include rosin, alkyl, ketene, dimer, stearic anhydride, alkenyl succinic anhydride, wax and the like, and paper strengthening agents include modified starch, polyvinyl alcohol, polyacrylamide, urea-formaldehyde, melamine-formaldehyde, polyethylenimine and the like, and these materials are optionally added to a water dilute raw material as appropriate.

For a papermaking method of the watermarked paper 100 of the present invention, an existing method for making mixed plant fiber paper may be employed. Thus, fibers swollen sufficiently with a water-diluted raw material having a raw material concentration of 0.5-10%, preferably 1-2%, are kneaded well, and allowed to flow onto and arranged on a bamboo blind-like/mesh-like wire part, and after water-squeezing, water is vaporized by warming, to produce the watermarked paper 100. At this time, before water-squeezing, the intermediate layer 20 is arranged between an upper side of the paper base material 11 and a lower side of the paper base material 11 and water-squeezing and heating are performed with the three layers being overlapped on one another, to mix the intermediate layer 20 with the three layers adhering to each other.

Since paper in which fibers other than plant fibers, for example, synthetic fibers are blended does not have a bonding force such as a hydrogen bond between synthetic fibers and thus often requires a binder, it is desirable that a synthetic fiber ratio and a binder amount as appropriate are preferably determined so that the strength of the paper is not decreased.

(Intermediate Layer Base Material)

In the case where an electrochromic type dimming mirror is configured as the intermediate layer 20, a laminate may be used, in which structures known in the art are laminated on one surface of the intermediate layer base material 21, and for example, a laminate in which an intermediate layer base material/a sealing layer/a dimming mirror layer/a conductive layer/a sealing layer are laminated in this order can be used. Preferably, a laminate in which an intermediate layer base material/a dimming mirror layer/a catalytic layer/an electrolyte layer/an ion accumulation layer/a conductive layer are laminated in this order or a laminate in which an intermediate layer base material/a dimming mirror layer/a catalytic layer/a buffer layer/an electrolyte layer/an ion accumulation layer/a conductive layer are laminated in this order is available.

Materials that are used for the intermediate layer base material 21 require good transparency and retainable strength even with a thin thickness as a support for the intermediate layer. Films with thickness of 6-300 μm made of a vinyl chloride resin, a polyethylene terephthalate resin (commonly known as PET), a nylon resin, a polyethylene resin, a polypropylene resin, a polyolefin resin, an ABS resin, a polycarbonate resin, a polyethylene naphthalate resin and the like can be used, but considering workability, strength, heat resistance and the like, a PET resin or a nylon resin with a thickness of 12-100 μm is preferable.

(Dimmer)

The dimmer 12 can change a watermark image visible when the watermarked paper 100 is viewed, by switching between a transparent state and a non-transparent mirror state due to a change in light transmission amount according to a voltage state. "Watermark image" refers to information which can be visually recognized, and includes characters, patterns, colors and shapes as well as pictorial images such as illustrations.

A control method of the dimmer 12 is not limited, as long as the dimmer 12 can switch between a mirror state and a transparent state according to a voltage. For example, an electrochromic type for performing electrical switching and a gasochromic type for performing switching using surrounding gases can be used. In terms of convenience and safety, an electrochromic type is preferable, and an all-solid-state electrochromic type dimming mirror in which all layers are made of solid, rather than liquid or gas, is more preferable.

As a material of a gasochromic type or electrochromic type dimming mirror layer, rare-earth metals such as yttrium and lanthanum, an alloy of hydride of rare-earth metal and magnesium, an alloy of magnesium and transition metal, an alloy of magnesium and nickel and the like are known, however, an alloy of magnesium and nickel can be preferably used as a material of a dimming element in an electrochromic type dimming mirror.

Palladium, platinum and the like can be used as a material of the catalytic layer, tantalum oxide, zirconium oxide and the like can be used as a material of the electrolyte layer, tungsten oxide and the like can be used as the ion storage layer, and indium oxide, tin oxide, zinc oxide and the like can be used as the transparent conductive film. In any of the thin layers, publicly-known methods for obtaining a desired thickness such as a vacuum deposition method and a sputtering method can be applied. However, the invention is not particularly limited to these layer configurations, materials and preparation methods.

In the dimmer 12 of the present embodiment, the entire dimmer 12 patterned into a watermark image may be controlled by a single external voltage. Alternatively, the dimmer 12 may be configured with multiple patterned portions, and be controlled by multiple external voltages.

(Power Supply)

The power supply 13 of the present invention is electrically connected to the dimmer 12 so as to be supply power. A mirror state and a transparent state of the dimmer 12 can be controlled with a change in voltage by power supplied from the power supply 13.

The power supply 13 is required to apply a voltage sufficient to change a light transmission state of the dimmer 12, and for example, a terminal for connection to external power, an antenna which can generate an alternating current from external electromagnetic waves, a solar cell, a paper battery and the like can be used.

The power supply 13 may be provided adjacent to the dimmer 12 and mixed together with the dimmer 12 into the paper base material 11, or may be provided, after the dimmer 12 is mixed, separately on the paper base material 11 and connected to the dimmer 12 so as to supply power from the power supply 13.

Publicly-known conductive metal materials such as copper, silver and aluminum can be used as the material of an antenna, and an IC chip is only required to have a rectifying function and a fixed voltage holding function and be thin and small.

A preparation method of an antenna includes, for example, previously forming, as an antenna substrate layer, a layer made of a resin material and forming on the resin layer a metal thin film, then applying and drying, on the metal thin film, a mask agent in a desired antenna shape, further dissolving and removing any unnecessary metal thin film using an etching method, and finally removing the mask agent, to prepare an antenna, and connecting and fixing an IC chip thereto. Alternatively, there may be presented another method including laminating previously, on the resin layer, the dimmer 12 and an IC chip in a connected state, and then applying a conductive ink containing conductive metal particles by a screen printing method, a gravure printing method and the like so as to connect to another terminal of the IC chip, to prepare an antenna.

In the case where the power supply 13 is formed as an antenna, when the watermarked paper 100 of the present invention is brought close to equipment which emits electromagnetic waves or magnetic flux, a voltage is applied to the dimmer 12 even in a contactless state, allowing the dimmer 12 to be controlled to be a mirror state.

(Adhesive Member)

The adhesive layer 14 can be used for improvement of adhesion of the dimmer 12 and the power supply 13 with the paper base material 11 when being mixed into the paper base material 11. Materials publicly known in the art having transparency can be used as the adhesive layer 14, and a heat-sensitive adhesive bondable at 50-120° C. can be preferably used.

(Other Constituent Elements)

The watermarked paper 100 may comprise any constituent elements as long as they do not prevent the above configurations and functions. It would be understood by a person skilled in the art that the watermarked paper 100 may comprise, for example, but is not limited to, the constituent elements mentioned below.

Figure 3:
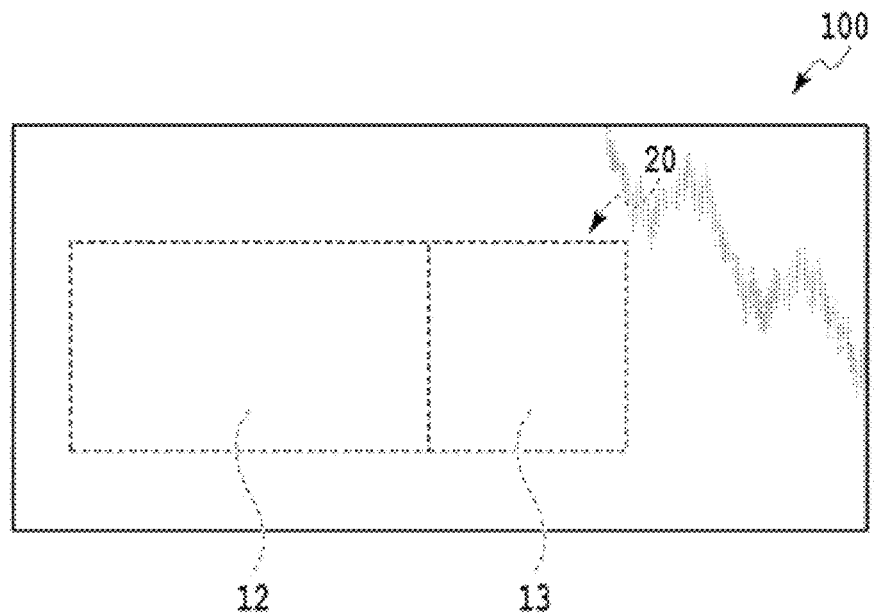
FIG. 3 is a plan view showing a state of watermarked paper of the present embodiment of which a dimmer is controlled to be transparent, observed under a normal follow light environment.
Figure 4:
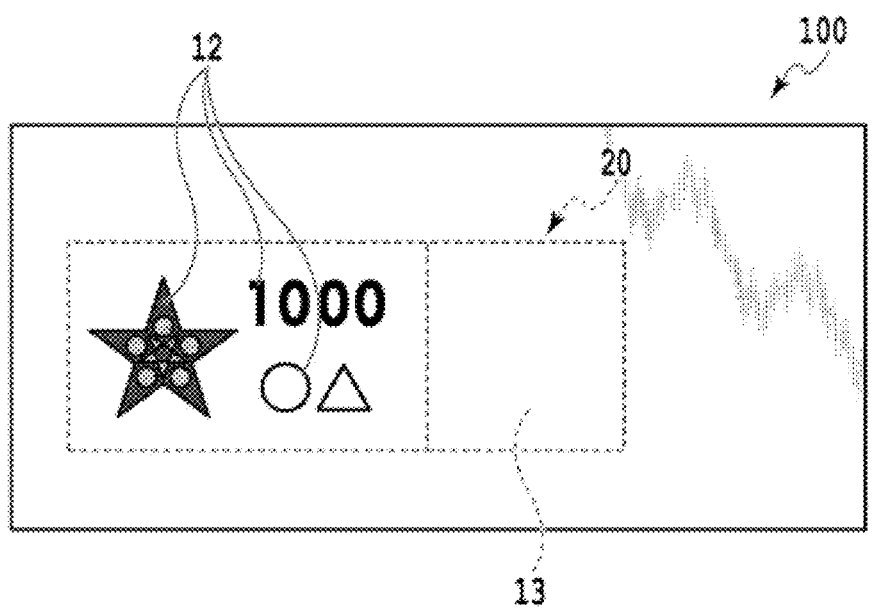
FIG. 4 is a plan view showing a state of watermarked paper of the present embodiment of which a dimmer is controlled to be in a mirror state, observed under a back light environment.

It will be described how a watermark image appears in the watermarked paper 100 of the present embodiment described above. FIG. 3 shows a state of the watermarked paper of the present embodiment of which the dimmer is controlled to be transparent, observed under a normal follow light environment, and FIG. 4 shows a state of the watermarked paper of the present embodiment of which the dimmer is controlled to be a mirror state, observed under a back light environment.

In the watermarked paper 100 of the present embodiment, with no voltage applied from the power supply 13 to the dimmer 12, the dimmer 12 is in a transparent state and transmits light as shown in FIG. 3, and therefore, a watermark image cannot be observed. This also applies to a back light environment.

On the other hand, when power is supplied to the power supply 13 with the watermarked paper 100 seen in a back-lit state where a light source is present in front of the viewing side, the dimmer 12 becomes a mirror state and nontransparent, and blocks light passing through the paper base material 11. In the watermarked paper 100, when the dimmer 12 having any watermark image pattern is controlled to be a mirror state under a back light environment or in an environment where a light source is present on the opposite side to a viewing position, a watermark effect is obtained due to the difference in light transmission amount between a transparent part and a mirror (non-transparent) part of the dimmer 12, and hence a watermark image can be observed as shown in FIG. 4.

Thus, the watermarked paper described above is such that the dimmer for controlling a light transmission amount according to a voltage is mixed as an intermediate layer into a paper layer and the power supply connected to the dimmer is provided in the intermediate layer or on the paper, which allows arbitrary change of a watermark pattern visible under a back light environment by control of a voltage from the power supply in the same field of view.

Second Embodiment

Figure 5:
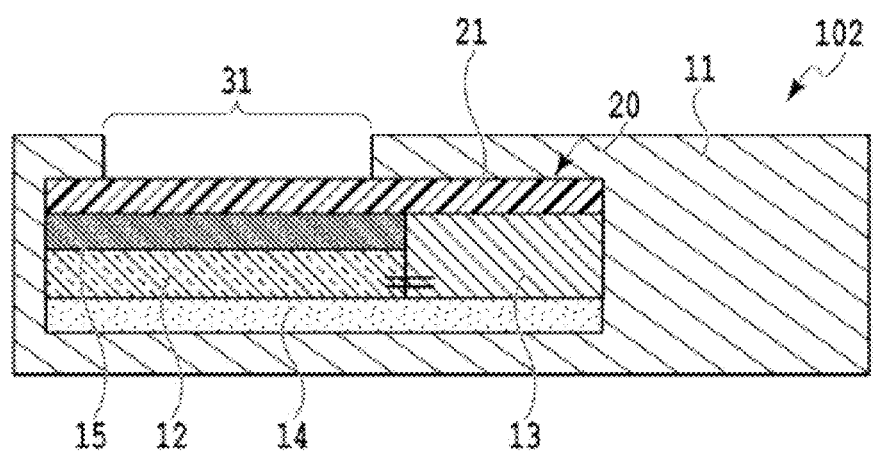
FIG. 5 is a cross-sectional view showing a layer configuration of watermarked paper according to the second embodiment.

FIG. 5 is a cross-sectional view showing a layer configuration of watermarked paper according to the second embodiment. Watermarked paper 102 of the present embodiment is configured to be further provided with a diffraction structure part 15 adjacent to a dimmer 12 of the watermarked paper 102 of the first embodiment shown in FIG. 2.

(Diffraction Structure Part)

In the diffraction structure part 15, in the presence of the dimmer 12 controlled to be a mirror state, light is incident from a windowed part 31 where the diffraction structure part 15 is exposed on the surface of the watermarked paper 102, i.e. on the diffraction structure part 15 on which optical image information 17 is recorded, in a follow light state where a light source is present in back of the viewing side, to generate diffracted light, and the diffracted light displays an image that is stereoscopically visible in 2D or 3D.

A single piece of or a plurality of pieces of optical image information 17 may be recorded on the diffraction structure part 15. In the case where a plurality of pieces of optical image information 17 are recorded, a display medium of the present invention can arbitrarily change an image visible during observation from the same field of view by control of the dimmer 12 mentioned below.

"Optical image information" in the present invention refers to one kind of watermark image, that is image information visible in 2D or 3D to be displayed by diffracted light generated when light is incident upon the diffraction structure part 15. Particularly, those configuring "optical image information" include paintings, characters, visually recognizable patterns including color change, and the like. Also, in the present embodiment, a pattern of the dimmer 12 and optical image information of the diffraction structure part 15 may be provided and aligned. Furthermore, a pattern of the dimmer 12 and optical image information of the diffraction structure part 15 and the windowed part 31 may be provided and aligned.

The diffraction structure part 15 can be formed by materials and formation methods known in the art. A thermoplastic resin, a thermosetting resin, an ultraviolet or electron beam curable resin and the like can be used as a material for forming the diffraction structure part 15. Examples of thermoplastic resin include an acrylic resin, an epoxy resin, a cellulose resin, a vinyl resin and the like. A urethane resin in which polyisocyanate is added as a cross-linking agent to acrylic polyol, polyester polyol and the like having a reactive hydroxyl group and crosslinked, a melamine resin, a phenol resin and the like can be used. As an ultraviolet or electron beam curable resin, epoxy (meth)acryl, urethane (meth)acrylate and the like can be used. The diffraction structure part 15 can be formed using these materials as principal materials by publicly-known application methods such as gravure printing methods and micro gravure methods.

Also, as a method for recording the optical image information 17 on the diffraction structure part 15, methods well known in the art can be used. Examples thereof may include, but not limited to, incorporating, in the diffraction structure part 15, a diffraction structure that is a fine irregular structure as the optical image information 17, and incorporating, in the diffraction structure part 15, a photosensitive material on which diffracted light of an image obtained by light with good coherence is recorded.

In the case where the optical image information 17 is recorded on the diffraction structure part 15, the diffraction structure part 15 includes a fine irregular structure, and a relief plate is used for forming the fine irregular structure. A relief plate is prepared by first irradiating the surface of an electron beam curable resin with an electron beam to perform exposure in a desired pattern and then performing development, to prepare a master plate, and subsequently forming a metal film on the surface of the master plate by an electroplating method to copy the irregular pattern of the master plate. Then, the relief plate is thermocompression-bonded to the diffraction structure part 15 or curing is performed while the relief plate is adhered to an uncured curable resin, forming a diffraction structure comprising a fine irregular structure.

Figure 6:
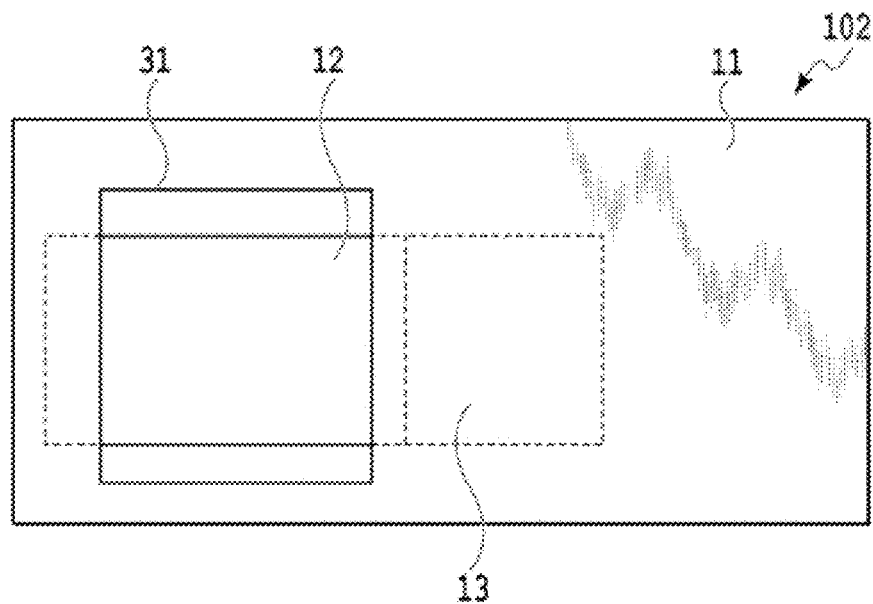
FIG. 6 is a plan view showing a state of observed watermarked paper of the present embodiment of which a dimmer is controlled to be transparent.
Figure 7:
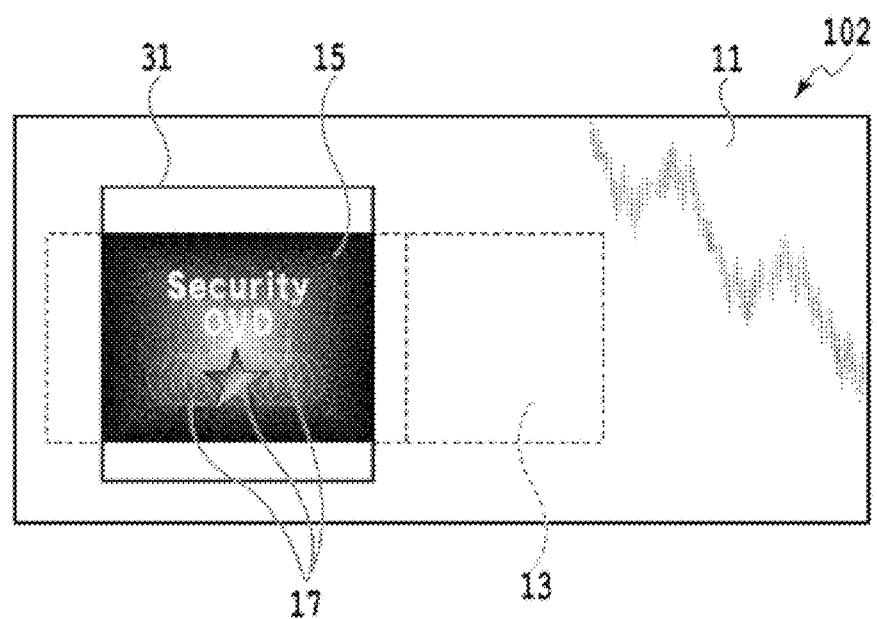
FIG. 7 is a plan view showing a state of observed watermarked paper of the present embodiment of which a dimmer is controlled to be a mirror state.

It will be described how a watermark image appears in the watermarked paper 102 of the present embodiment described above. FIG. 6 shows a state of observed watermarked paper of the present embodiment of which the dimmer is controlled to be transparent, and FIG. 7 shows a state during observation of the watermarked paper of the present embodiment of which the dimmer is controlled to be a mirror state.

In the watermarked paper 102 of the present embodiment, when the watermarked paper 102 is seen in a follow light state where a light source is present in back of the viewing side with no power being supplied to the power supply 13, light is incident from the windowed part 31 where the diffraction structure part 15 is exposed on the surface of the watermarked paper 102 upon the diffraction structure part 15 to generate diffracted light, however, the dimmer 12 is in a state controlled to be transparent, and therefore, the diffracted light is transmitted, and hence, a watermark image cannot be observed.

On the other hand, when power is supplied to the power supply 13 with the watermarked paper 102 seen in a follow light state where a light source is present in back of the viewing side, the dimmer 12 becomes a state controlled to be a mirror state, and thus, light incident from the windowed part 31 upon the diffraction structure part 15 is reflected by the dimmer 12 in a mirror state, and the reflected light allows optical image information recorded on the diffraction structure part 15 to be observed as a stereoscopically visible image in 2D or 3D.

In the watermarked paper of the present embodiment, by laminating the diffraction structure part having optical image information on the dimmer, with a change in voltage from the power supply to the dimmer, the dimmer in a mirror state serves as a reflection layer of the diffraction structure part, and optical image information previously recorded on the diffraction structure part is displayed, and the optical image information is allowed to be viewed from an exposure part provided on the paper.

Third Embodiment

Figure 8:
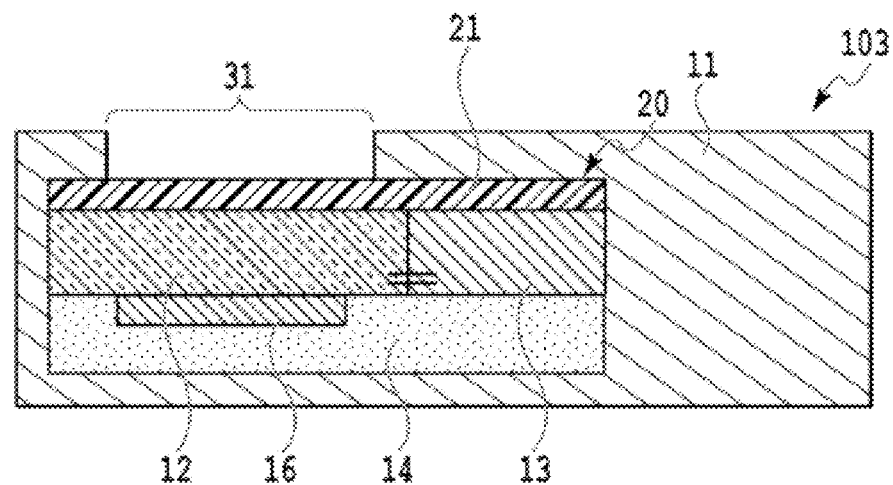
FIG. 8 is a cross-sectional view showing a layer configuration of watermarked paper according to the third embodiment.

FIG. 8 is cross-sectional view showing a layer configuration of watermarked paper according to the third embodiment. Watermarked paper 103 of the present embodiment is configured to be further provided with a printed layer 16 on a lower layer of a dimmer 12 of the watermarked paper 103 of the first embodiment.

(Printed Layer)

The printed layer 16 is a layer having a watermark image of which the shape is visually recognizable such as a character, an illustration and a pattern. The printed layer 16 can be formed at any position of the watermarked paper 103 considering decorativeness and/or functionality.

The printed layer 16 may be formed in a part of the dimmer 12 considering a light transmitting property and the like. For example, in the case where the printed layer 16 is formed in a part where the dimmer 12 is exposed on the watermarked paper 103 and on a lower layer of the dimmer 12, in a follow light state where a light source is present in back of the viewing side, a pattern of the printed layer 16 is visible when the dimmer 12 is in a transparent state, but the printed layer 16 is covered when the dimmer 12 is in a mirror state, making the printed layer invisible.

The printed layer 16 can be formed using publicly-known materials and commercially available printing inks which have good visibility and good adhesion with a layer in direct contact such as the dimmer 12, and can also be formed by publicly-known printing methods such as a relief printing method, a gravure printing method, an offset printing method and a screen printing method.

Figure 9:
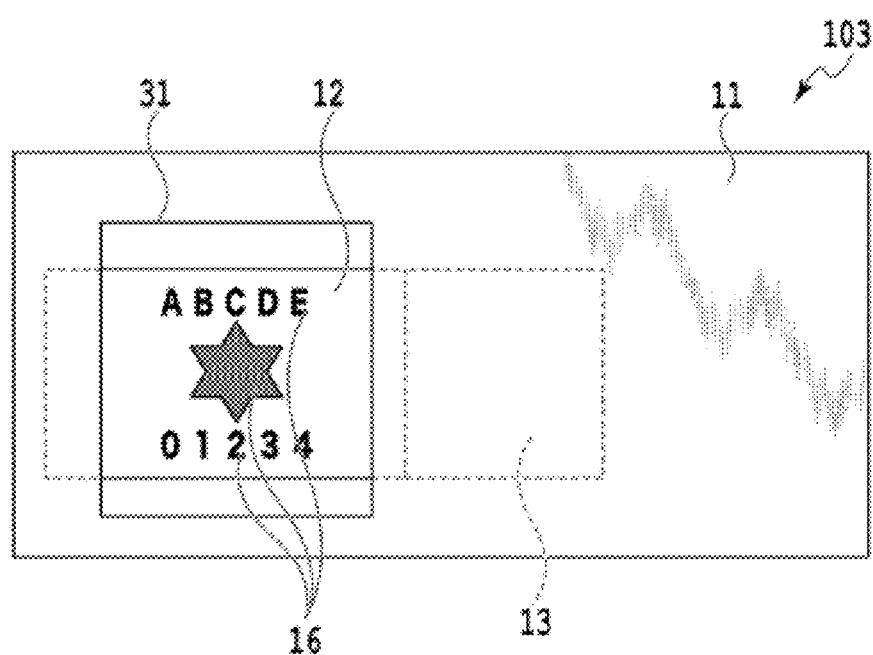
FIG. 9 is a plan view showing a state of observed watermarked paper of the present embodiment of which a dimmer is controlled to be transparent.
Figure 10:
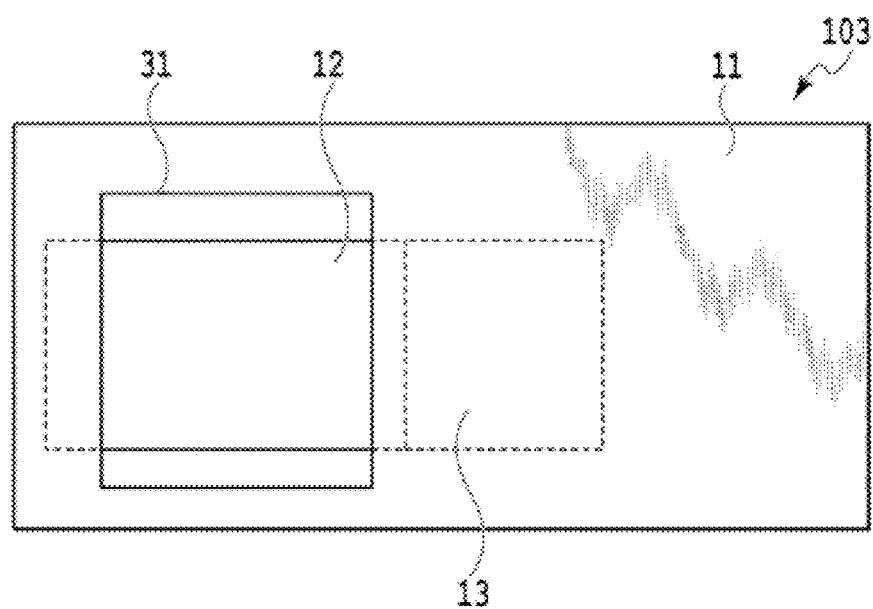
FIG. 10 is a plan view showing a state of observed watermarked paper of the present embodiment of which a dimmer is controlled to be in a mirror state.

Here, it will be described how a watermark image appears in the watermarked paper 103 of the present third embodiment. FIG. 9 shows a state of observed watermarked paper of the present embodiment of which the dimmer is controlled to be transparent, and FIG. 10 shows a state of observed watermarked paper of the present embodiment of which the dimmer is controlled to be a mirror state.

In the watermarked paper 103 of the present embodiment, when light is incident from the windowed part 31 where the dimmer 12 is exposed, the light is transmitted in the state where the dimmer 12 is controlled to be transparent, and hence, a watermark image printed on the printed layer 16 can be observed.

On the other hand, when power is supplied to the power supply 13 with the watermarked paper 103 seen in a follow light state where a light source is present in back of the viewing side, the dimmer 12 becomes a state controlled to be a mirror state, and thus, even when light is incident from the windowed part 31 where the dimmer 12 is exposed, the light is blocked by the dimmer 12, and hence, a watermark image printed on the printed layer 16 cannot be observed.

In the watermarked paper of the present embodiment, by providing the printed layer on which a watermark image is printed, with a change in voltage from the power supply to the dimmer, optical image information previously printed on the printed layer is displayed and the optical image information is allowed to be viewed from an exposure part provided on the paper.

Fourth Embodiment

Figure 11:
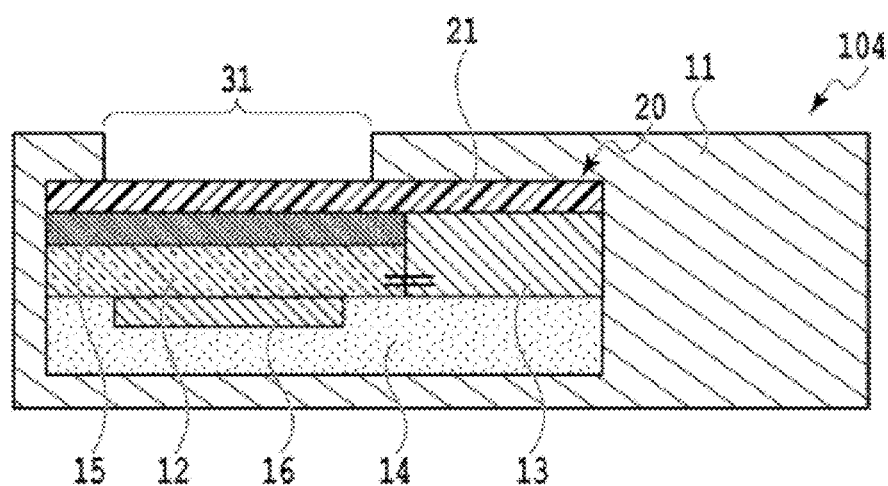
FIG. 11 is a cross-sectional view showing a layer configuration of watermarked paper according to the fourth embodiment.

FIG. 11 is a cross-sectional view showing a layer configuration of watermarked paper according to the fourth embodiment. Watermarked paper 104 of the present embodiment is provided with both of the diffraction structure part 15 of the second embodiment and the printed layer 16 of the third embodiment. The printed layer 16 may be drawn directly on the diffraction structure part 15 or a dimmer 12 instead of using a layer-forming material.

In the configuration provided with the printed layer 16 and the diffraction structure part 15, in the case where the printed layer 16 is formed on top of the diffraction structure part 15 or between the diffraction structure part 15 and the dimmer 12, regardless of a condition of the dimmer 12, a pattern and the like of the printed layer 16 are visible. In the case where the printed layer 16 is formed on top of the diffraction structure part 15 or between the diffraction structure part 15 and the dimmer 12, the printed layer 16 is preferably formed by materials which do not prevent light transmission. Alternatively, the printed layer 16 may be directly drawn on the dimmer 12 without a layer-forming material.

Figure 12:
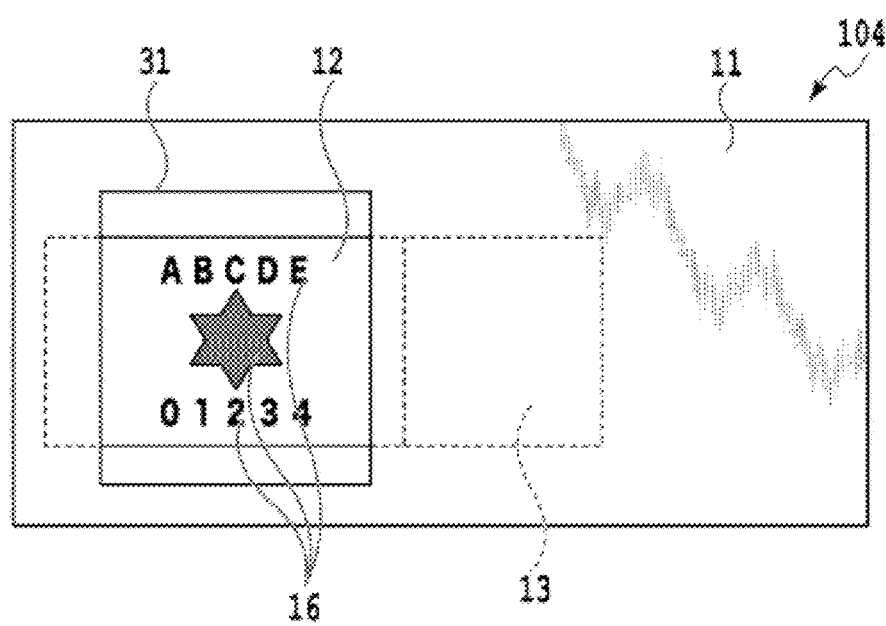
FIG. 12 is a plan view showing a state of observed watermarked paper of the present embodiment of which a dimmer is controlled to be transparent.
Figure 13:
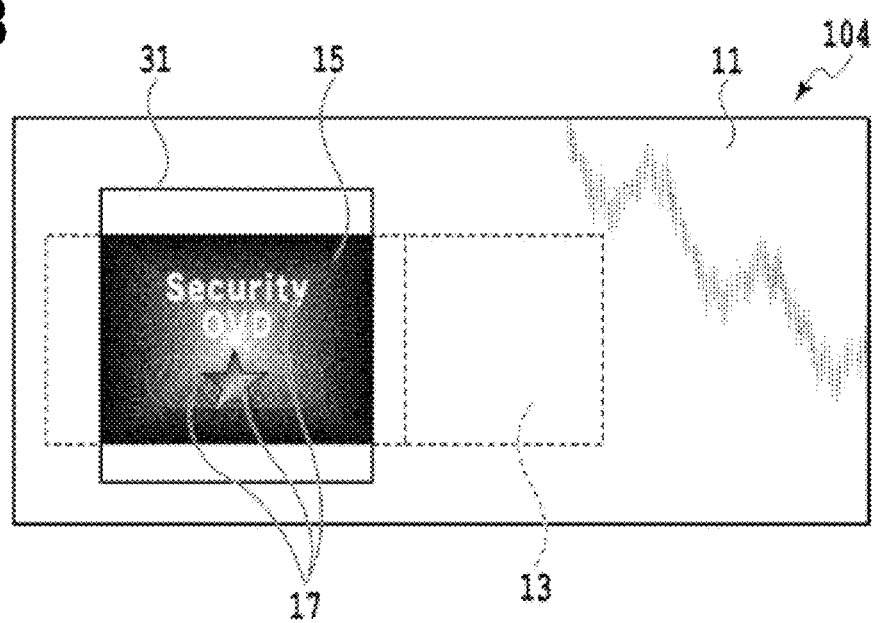
FIG. 13 is a plan view showing a state of observed watermarked paper of the present embodiment of which a dimmer is controlled to be in a mirror state.

Here, it will be described how a watermark image appears in the watermarked paper 104 of the present fourth embodiment. FIG. 12 shows a state of observed watermarked paper of the present embodiment of which the dimmer is controlled to be transparent, and FIG. 13 shows a state of observed watermarked paper of the present embodiment of which the dimmer is controlled to be a mirror state.

In the watermarked paper 104 of the present embodiment, when light is incident from a windowed part 31 where the dimmer 12 is exposed, the light is transmitted in the state where the dimmer 12 is controlled to be transparent, and hence, a watermark image printed on the printed layer 16 can be observed.

On the other hand, in the state where the dimmer 12 is controlled to be a mirror state, even when light is incident from the windowed part 31 where the dimmer 12 is exposed, the light is blocked by the dimmer 12, and hence, a watermark image printed on the printed layer 16 cannot be observed.

In the watermarked paper of the present embodiment, by laminating, on the dimmer, the diffraction structure part with optical image information, with a change in voltage from the power supply to the dimmer, the dimmer serves as a reflection layer of the diffraction structure part and optical image information previously recorded on the diffraction structure part or a watermark image previously printed on the printed layer is allowed to be viewed from an exposure part provided on the paper.

Thus, according to the above embodiments, watermarked paper having multiple tones can be prepared by a method different from a dark watermarking method, and has high strength and surface smoothness, and has a structure in which a mixed intermediate layer is exposed on a part of the paper and optical change appears in the exposed part, and further, allows arbitrary change of a watermark pattern or display of recorded optical image information even during observation from the same field of view.

Watermarked paper described above is not limited to an application such as forgery-preventing paper which uses a watermark effect as a forgery prevention measure, and for example, can be utilized also in the fields of decoration, toys, learning materials and the like.

EXAMPLES

Next, the present invention and an effect thereof will be described by the use of particular examples. The Examples, however, do not limit a range of applicability of the present invention.

Example 1

In the present Example, watermarked paper 101 of the first embodiment was prepared, and an effect thereof was examined.

A polyethylene terephthalate (PET) film having a thickness of 25 μm was used as an intermediate layer base material 21. To form a dimmer 12 on a part of one surface of the intermediate layer base material 21, parts other than the dimmer 12 were covered with a mask, and an alloy of magnesium and nickel was formed by a sputtering method so as to have a film thickness of 100 nm, and thus, a dimming mirror layer in the dimmer 12 was laminated.

Then, a water-soluble mask ink comprising the following composition 1 was applied/dried to a part to serve as an electrode in the dimming mirror layer by a gravure printing method, to form a first mask printed layer having a film thickness of 5 μm, and subsequently palladium was formed by a sputtering method so as to have a film thickness of 100 nm with parts other than necessary parts covered with a mask, and thus, a catalytic layer in the dimmer 12 was laminated.

| (Composition 1) "Water-soluble mask ink composition" ||
| --- | --- |
| Water-soluble inorganic salt | 10.0 parts by weight |
| Hydrophilic inorganic filler | 5.0 parts by weight |
| Isopropyl alcohol | 10.0 parts by weight |
| Water | 75.0 parts by weight |

Then, tantalum oxide was formed by a sputtering method so as to have a film thickness of 100 nm with parts other than the dimmer 12 covered with a mask, and thus, an electrolyte layer in the dimmer 12 was laminated.

Then, tungsten oxide was formed by a sputtering method so as to have a film thickness of 100 nm with parts other than the dimmer 12 covered with a mask, and thus, an ion storage layer in the dimmer 12 was prepared.

Then, a mixture of indium oxide and tin oxide (ITO) was formed by a sputtering method so as to have a film thickness of 100 nm, and thus, a conductive film layer in the dimmer 12 was laminated. Then, in a part of the conductive film layer, the same composition as that of the first mask printed layer was applied/dried, by the same method, to a part that is different from the first mask printed layer and that serves as another electrode, to form a second mask printed layer so as to have a film thickness of 5 μm.

Then, the first mask layer and the second mask layer were removed by water washing and a part of the catalytic layer and of the conductive film layer were respectively exposed, and thus, an electrode was created. An IC chip was connected to this electrode, and further, an ink for a printed antenna comprising the following composition 2 was applied/dried in a desired antenna shape by a screen printing method on the intermediate layer base material 21 so that an end of the antenna was connected to the IC chip, to form an antenna, and thus, the dimmer 12 and the power supply 13 were provided on the intermediate layer base material 21.

| (Composition 2) "Ink composition for printed antenna" ||
| --- | --- |
| Silver | 80.0 parts by weight |
| Diethylene glycol monoethyl ether acetate | 20.0 parts by weight |

Then, an adhesive layer ink comprising the following composition 3 was applied/dried to the entire front and back surfaces of the intermediate layer base material 21 by a gravure printing method to laminate an adhesive layer 14 having a film thickness of 3 μm, and thus, an intermediate layer 20 was prepared.

| (Composition 3) "Ink composition for adhesive layer" ||
| --- | --- |
| Polyester resin | 20.0 parts by weight |
| Toluene | 20.0 parts by weight |
| Methyl ethyl ketone | 60.0 parts by weight |

Then, softwood pulp was beaten in water to obtain those having a raw material concentration of 1.5%, and subsequently was mixed one time using a handmade paper machine, and the intermediate layer 20 was arranged on the mixed softwood pulp and further were mixed once again and were dehydrated, and were heated and dried, to prepare watermarked paper 101 having a thickness of approximate 120 μm shown in FIG. 1.

When bringing the resulting watermarked paper 101 close to an alternating-current magnetic field generation device for power supply provided with a light source, to apply a voltage of +5V to the dimmer 12, the entire dimmer 12 became a non-transparent mirror state and a watermark pattern formed by the dimmer 12 could be observed due to transmitted light from behind the watermarked paper 101, and when voltage application was stopped, the watermark pattern disappeared.

Example 2

In the present Example, watermarked paper 102 of the second embodiment was prepared, and an effect thereof was examined.

A polyethylene terephthalate (PET) film having a thickness of 25 μm was used as an intermediate layer base material 21. An ink comprising the following composition 4 was applied/dried over the entire surface or in a part of one surface of the intermediate layer base material 21 by a gravure printing method to provide a diffraction structure layer having a film thickness of 1.5 μm, and subsequently, embossing was performed to press, against the diffraction structure layer, a relief plate for expressing a previously prepared diffracted light pattern of an image as shown in FIG. 13 (see FIG. 13) while applying thermal pressure, and thus, a desired diffraction structure part 15 was formed on the diffraction structure layer.

| (Composition 4) "Diffraction structure layer ink composition" ||
| --- | --- |
| Acrylic resin | 10.0 parts by weight |
| Isocyanate curing agent | 8.0 parts by weight |
| Methyl ethyl ketone | 82.0 parts by weight |

To provide a dimmer 12 on the diffraction structure part 15, parts other than the dimmer 12 were covered with a mask, and an alloy of magnesium and nickel was applied by a sputtering method so as to have a film thickness of 100 nm, and thus, a dimming mirror layer in the dimmer 12 was laminated.

Then, a water-soluble mask ink comprising the following composition 5 was applied/dried to a part to serve as an electrode in the dimming mirror layer by a gravure printing method, to form a first mask printed layer having a film thickness of 5 and subsequently, palladium was formed by a sputtering method so as to have a film thickness of 100 nm with parts other than necessary parts covered with a mask, and thus, a catalytic layer in the dimmer 12 was laminated.

(Composition 5)
"Water-soluble mask ink composition"

| | |
|---|---|
| Water-soluble inorganic salt | 10.0 parts by weight |
| Hydrophilic inorganic filler | 5.0 parts by weight |
| Isopropyl alcohol | 10.0 parts by weight |
| Water | 75.0 parts by weight |

Then, tantalum oxide was applied by a sputtering method so as to have a film thickness of 100 nm with parts other than the dimmer 12 covered with a mask, and thus, an electrolyte layer in the dimmer 12 was laminated.

Then, tungsten oxide was applied by a sputtering method so as to have a film thickness of 100 nm with parts other than the dimmer 12 covered with a mask, and thus, an ion storage layer in the dimmer 12 was prepared.

Then, a mixture of indium oxide and tin oxide (ITO) was applied by a sputtering method so as to have a film thickness of 100 nm, and thus, a conductive film layer in the dimmer 12 was laminated. Then, in a part of the conductive film layer, the same composition as that of the first mask printed layer was applied/dried, by the same method, to a part that is different from the first mask printed layer and that serves as another electrode, to form a second mask printed layer so as to have a film thickness of 5 μm.

Then, the first mask layer and the second mask layer were removed by water washing and a part of the catalytic layer and of the conductive film layer were respectively exposed, and thus, an electrode was created. An IC chip was connected to the electrode, and further, an ink for a printed antenna comprising the following composition 6 was applied/dried in a desired antenna shape by a screen printing method on the intermediate layer base material 21 so that an end of the antenna was connected to the IC chip, to form an antenna, and thus, the dimmer 12 and the power supply 13 were provided on the intermediate layer base material 21.

(Composition 6)
"Ink composition for printed antenna"

| | |
|---|---|
| Silver | 80.0 parts by weight |
| Diethylene glycol monoethyl ether acetate | 20.0 parts by weight |

Then, an adhesive layer ink comprising the following composition 7 was applied/dried to the entire front and back surfaces of the intermediate layer base material 21 by a gravure printing method to laminate an adhesive layer 14 having a film thickness of 3 and thus, an intermediate layer 20 having the diffraction structure part 15 was prepared.

(Composition 7)
"Ink composition for adhesive layer"

| | |
|---|---|
| Polyester resin | 20.0 parts by weight |
| Toluene | 20.0 parts by weight |
| Methyl ethyl ketone | 60.0 parts by weight |

Then softwood pulp was beaten in water to obtain a raw material concentration of 1.5%, and subsequently was mixed one time using a handmade paper machine, and the intermediate layer 20 was arranged on the mixed softwood pulp. Then, mixing was performed by the use of a papermaking net provided with a closed part to form a windowed part in a desired shape, and dehydration was performed and heating and drying was performed, to prepare the watermarked paper 102 having a thickness of 120 μm in which the diffraction structure part 15 could be seen from the windowed part 31.

In the resulting watermarked paper 102, with no power supplied to the power supply 13, even when light was incident upon the diffraction structure part 15, diffracted light was not generated since the dimmer 12 was in a transparent state, and a foundation of the dimmer 12 could be seen. Alternatively, under a follow light environment in which a light source was present in back of or on top of an observer, when bringing the watermarked paper 102 close to an alternating-current magnetic field generation device for power supply, to apply a voltage of +5V to the dimmer 12, the entire dimmer 12 became a non-transparent mirror state, and light incident upon the diffraction structure part 15 exposed on the windowed part 31 of the watermarked paper 102 was reflected to become diffracted light, and an observer could view characters and images that were optical image information 17 using the diffracted light.

Under a back light environment in which a light source was present in front of an observer or in back of the watermarked paper 102, when bringing the watermarked paper 102 close to an alternating-current magnetic field generation device for power supply, to apply a voltage of +5V to the dimmer 12, a part of the dimmer 12 mixed in a paper base material 11 other than the windowed part 31 was also in a mirror state, which blocked transmitted light, and therefore, a part where the dimmer 12 was present and a part where the dimmer 12 was not present could be observed as a watermark, and further, when power supply to the dimmer 12 was stopped in this state, it was confirmed that the dimmer 12 looked black, i.e. was changed from a mirror state to a transparent state, and hence the watermark pattern changed.

Thus, watermarked paper of the present invention changes a watermark pattern by power supply to a dimmer, and allows, when a diffraction structure, if applicable, is observed from a windowed part 31 provided on the paper, to control generation of diffracted light by power supply to the dimmer 12, and can change arbitrarily display of optical image information 17 recorded on the diffraction structure even during observation from the same field of view.

REFERENCE SIGNS LIST

100, 101, 102, 103, 104 . . . Watermarked paper; 11 . . . Paper base material; 12 . . . Dimmer; 13 . . . Power supply; 14 . . . Adhesive layer; 15 . . . Diffraction structure part; 16 . . . Printed layer; 17 . . . Optical image information; 20 . . . Intermediate layer; 21 . . . Intermediate layer base material; 31 . . . Windowed part

What is claimed is:

1. A watermarked paper, comprising:
a paper base material; and
an intermediate layer, which is at least partially surrounded with the paper base material, the intermediate layer is a laminate comprising an intermediate base layer, an adhesive layer, and a device layer, which comprises a patterned dimmer and a power supply, which is adjacent to the patterned dimmer;
the device layer is between the intermediate base layer and the adhesive layer in direct physical contact with each of the intermediate base layer and the adhesive layer;
the intermediate layer has thickness of about 6-300 µm;
the adhesive layer is in direct physical contact with the paper base material;
the power supply supplies power to the patterned dimmer;
a pattern of the patterned dimmer defines a watermark image that switches between a transparent state and a mirror state by applying a voltage from the power supply to the patterned dimmer;
the patterned dimmer comprises multiple patterned layers, each of which has the pattern of the patterned dimmer.

2. The watermarked material of claim 1, wherein the intermediate layer is totally surrounded by the paper base material.

3. The watermarked material of claim 1, wherein a surface of the paper base material comprises a windowed part which exposes a part of the intermediate base layer.

4. The watermarked material of claim 3, wherein the device layer further comprises a diffraction structure laminated on the patterned dimmer, such that the diffraction structure is in direct physical contact with the intermediate base layer; the patterned dimmer is in direct physical contact with the adhesive layer, the power supply is adjacent to the diffraction structure and the patterned dimmer.

5. The watermarked material of claim 4, wherein the pattern of the patterned dimmer and a pattern of optical image information of the diffraction structure are matched in position.

6. The watermarked material of claim 4, wherein the pattern of the patterned dimmer and a pattern of optical image information of the diffraction structure and the windowed part are matched in position.

7. The watermarked material of claim 4, wherein the intermediate layer further comprises a printed layer having a watermark image, the printed layer being provided between the patterned dimer and the adhesive layer, in direct physical contact with each of the patterned dimer and the adhesive layer, in a position matching a position of the windowed part.

8. The watermarked material of claim 1, wherein the intermediate base material comprises a vinyl chloride resin, a polyethylene terephthalate resin, a nylon resin, a polyethylene resin, a polypropylene resin, a polyolefin resin, an ABS resin, a polycarbonate resin, or a polyethylene naphthalate resin.

9. The water marked material of claim 8, wherein the intermediate base layer comprises a PET resin or a nylon resin and has a thickness of 12-100 µm.

10. The watermarked material of claim 9, wherein the patterned dimmer comprises
a) a patterned dimming mirror layer,
b) a patterned catalytic layer,
c) a patterned electrolyte layer,
d) a patterned ion accumulation layer and
e) a patterned conductive layer laminated in this order, wherein each of the patterned dimming mirror layer, the patterned catalytic layer, the patterned electrolyte layer, the patterned ion accumulation layer and the patterned conductive layer has the pattern of the patterned dimmer.

11. The watermarked material of claim 9, wherein the patterned dimmer comprising
a) a patterned dimming mirror layer,
b) a patterned catalytic layer,
c) a patterned buffer layer,
d) electrolyte layer,
e) patterned ion accumulation layer and
f) a patterned conductive layer laminated in this order, wherein each of the patterned dimming mirror layer, the patterned catalytic layer, the patterned buffer layer, the patterned electrolyte layer, the patterned ion accumulation layer and the patterned conductive layer has the pattern of the patterned dimmer.

* * * * *